US009246860B2

(12) United States Patent
Sargent (10) Patent No.: US 9,246,860 B2
(45) Date of Patent: Jan. 26, 2016

(54) SYSTEM, METHOD AND COMPUTER PROGRAM PRODUCT FOR GATHERING INFORMATION RELATING TO ELECTRONIC CONTENT UTILIZING A DNS SERVER (71) Applicant: McAfee Inc., Santa Clara, CA (US)

(72) Inventor: John Sargent, Burkingham (GB)

(73) Assignee: McAfee, Inc., Santa Clara, CA (US)

( * ) Notice: Subject to any disclaimer, the term of this patent is extended or adjusted under 35 U.S.C. 154(b) by 99 days.

(21) Appl. No.: 14/049,858

(22) Filed: Oct. 9, 2013

(65) Prior Publication Data

US 2014/0040403 A1 Feb. 6, 2014

Related U.S. Application Data (63) Continuation of application No. 11/351,840, filed on Feb. 9, 2006, now Pat. No. 8,601,160.

(51) Int. Cl.
*H04L 12/58* (2006.01)

(52) U.S. Cl.
CPC ...................... *H04L 51/12* (2013.01)

(58) Field of Classification Search
USPC ......................................... 709/206
See application file for complete search history.

(56) References Cited

U.S. PATENT DOCUMENTS

| 5,121,345 A | 6/1992 | Lentz |
| 5,283,856 A | 2/1994 | Gross et al. |
| 5,509,120 A | 4/1996 | Merkin et al. |
| 5,619,648 A | 4/1997 | Canale et al. |
| 5,623,600 A | 4/1997 | Ji et al. |
| 5,724,567 A | 3/1998 | Rose et al. |
| 5,765,028 A | 6/1998 | Gladden |
| 5,805,911 A | 9/1998 | Miller |
| 5,832,208 A | 11/1998 | Chen |
| 5,845,285 A | 12/1998 | Klein |
| 5,870,549 A | 2/1999 | Bobo, II |
| 5,987,610 A | 11/1999 | Franczek et al. |
| 5,999,932 A | 12/1999 | Paul |
| 6,023,723 A | 2/2000 | McCormick et al. |
| 6,047,277 A | 4/2000 | Parry et al. |
| 6,052,709 A | 4/2000 | Paul |
| 6,073,142 A | 6/2000 | Geiger et al. |
| 6,092,101 A | 7/2000 | Birrell et al. |
| 6,101,531 A | 8/2000 | Eggleston et al. |

(Continued)

FOREIGN PATENT DOCUMENTS

| EP | 0813162 | 12/1997 |
| GB | 2396993 | 7/2004 |

(Continued)

OTHER PUBLICATIONS

Laurie, B. et al. "DDNS Security (DNSSEC) Hashed Authenticated Denial of Existence," RFC 5155, Mar. 2008.*

(Continued)

*Primary Examiner* — Melvin H Pollack
(74) *Attorney, Agent, or Firm* — Patent Capital Group (57) ABSTRACT A system, method and computer program product are provided. In use, a checksum associated with electronic content is calculated. Further, a domain name service (DNS) server is queried utilizing the checksum. In response to the query, information is received from the DNS server which relates to the electronic content.

29 Claims, 5 Drawing Sheets

(56) References Cited

U.S. PATENT DOCUMENTS

| | | |
|---|---|---|
| 6,144,934 A | 11/2000 | Stockwell et al. |
| 6,161,130 A | 12/2000 | Horvitz et al. |
| 6,167,434 A | 12/2000 | Pang |
| 6,189,002 B1 | 2/2001 | Roitblat |
| 6,199,102 B1 | 3/2001 | Cobb |
| 6,199,103 B1 | 3/2001 | Sakaguchi et al. |
| 6,219,818 B1 | 4/2001 | Freivald |
| 6,266,692 B1 | 7/2001 | Greenstein |
| 6,321,267 B1 | 11/2001 | Donaldson |
| 6,330,590 B1 | 12/2001 | Cotten |
| 6,356,935 B1 | 3/2002 | Gibbs |
| 6,366,950 B1* | 4/2002 | Scheussler et al. ............ 709/206 |
| 6,370,139 B2 | 4/2002 | Redmond |
| 6,370,526 B1 | 4/2002 | Agrawal et al. |
| 6,393,423 B1 | 5/2002 | Goedken |
| 6,393,464 B1 | 5/2002 | Dieterman |
| 6,393,465 B2 | 5/2002 | Leeds |
| 6,396,513 B1 | 5/2002 | Helfman |
| 6,396,830 B2* | 5/2002 | Aravamudan et al. ........ 370/356 |
| 6,421,709 B1 | 7/2002 | McCormick et al. |
| 6,453,327 B1 | 9/2002 | Nielsen |
| 6,460,050 B1 | 10/2002 | Pace et al. |
| 6,480,885 B1 | 11/2002 | Olivier et al. |
| 6,546,390 B1 | 4/2003 | Pollack et al. |
| 6,598,026 B1 | 7/2003 | Ojha et al. |
| 6,609,081 B1 | 8/2003 | de Varennes et al. |
| 6,609,205 B1 | 8/2003 | Bernhard et al. |
| 6,615,241 B1 | 9/2003 | Miller et al. |
| 6,615,242 B1 | 9/2003 | Riemers |
| 6,650,890 B1 | 11/2003 | Irlam et al. |
| 6,654,787 B1 | 11/2003 | Aronson et al. |
| 6,665,725 B1 | 12/2003 | Dietz et al. |
| 6,675,162 B1 | 1/2004 | Russell-Falla et al. |
| 6,684,394 B1 | 1/2004 | Shann |
| 6,687,740 B1 | 2/2004 | Gough et al. |
| 6,691,156 B1 | 2/2004 | Drummond et al. |
| 6,718,367 B1 | 4/2004 | Ayyadurai |
| 6,732,157 B1 | 5/2004 | Gordon et al. |
| 6,748,422 B2 | 6/2004 | Morin et al. |
| 6,751,728 B1* | 6/2004 | Gunter et al. ................ 713/153 |
| 6,757,830 B1 | 6/2004 | Tarbotton et al. |
| 6,769,016 B2 | 7/2004 | Rothwell et al. |
| 6,772,196 B1 | 8/2004 | Kirsch et al. |
| 6,772,292 B2 | 8/2004 | Garber et al. |
| 6,779,021 B1 | 8/2004 | Bates et al. |
| 6,802,012 B1 | 10/2004 | Smithson et al. |
| 6,807,566 B1 | 10/2004 | Bates et al. |
| 6,868,498 B1 | 3/2005 | Katsikas |
| 6,915,334 B1 | 7/2005 | Hall |
| 6,931,433 B1* | 8/2005 | Ralston et al. ................ 709/206 |
| 6,941,467 B2 | 9/2005 | Judge et al. |
| 6,988,143 B2 | 1/2006 | O'Neill et al. |
| 7,006,993 B1 | 2/2006 | Cheong et al. |
| 7,007,080 B2 | 2/2006 | Wilson |
| 7,016,939 B1 | 3/2006 | Rothwell et al. |
| 7,047,297 B2 | 5/2006 | Huntington et al. |
| 7,072,942 B1 | 7/2006 | Maller |
| 7,080,366 B2 | 7/2006 | Kramskoy et al. |
| 7,082,430 B1 | 7/2006 | Danielsen et al. |
| 7,103,645 B2 | 9/2006 | Leighton et al. |
| 7,149,189 B2 | 12/2006 | Huntington et al. |
| 7,155,500 B2* | 12/2006 | Nikander .................... 709/223 |
| 7,162,698 B2 | 1/2007 | Huntington et al. |
| 7,191,327 B2 | 3/2007 | Viljoen et al. |
| 7,209,954 B1 | 4/2007 | Rothwell et al. |
| 7,213,061 B1 | 5/2007 | Hite et al |
| 7,213,062 B1 | 5/2007 | Raciborski et al. |
| 7,213,260 B2 | 5/2007 | Judge |
| 7,225,244 B2 | 5/2007 | Reynolds et al. |
| 7,228,417 B2* | 6/2007 | Roskind ...................... 713/168 |
| 7,240,199 B2* | 7/2007 | Tomkow ..................... 713/168 |
| 7,299,261 B1 | 11/2007 | Oliver et al. |
| 7,304,994 B2* | 12/2007 | Dubnicki et al. ............. 370/392 |
| 7,321,922 B2* | 1/2008 | Zheng et al. ................. 709/206 |
| 7,363,361 B2* | 4/2008 | Tewari et al. ................ 709/223 |
| 7,386,889 B2 | 6/2008 | Shay |
| 7,437,760 B2* | 10/2008 | Dettinger et al. .............. 726/24 |
| 7,447,798 B2* | 11/2008 | Klinker ........................ 709/240 |
| 7,506,155 B1 | 3/2009 | Stewart et al. |
| 7,516,489 B2 | 4/2009 | Lahti |
| 7,552,176 B2* | 6/2009 | Atkinson et al. ............. 709/206 |
| 7,565,423 B1 | 7/2009 | Fredricksen |
| 7,574,499 B1 | 8/2009 | Swildens et al. |
| 7,580,982 B2 | 8/2009 | Owen et al. |
| 7,590,684 B2 | 9/2009 | Herrmann |
| 7,594,113 B2 | 9/2009 | Tan et al. |
| 7,636,306 B2 | 12/2009 | Dougall et al. |
| 7,647,376 B1 | 1/2010 | Jagger et al. |
| 7,647,411 B1 | 1/2010 | Schiavone et al. |
| 7,650,359 B2* | 1/2010 | Sato et al. ..................... 707/805 |
| 7,664,819 B2 | 2/2010 | Murphy et al. |
| 7,681,234 B2* | 3/2010 | Florencio et al. ............... 726/22 |
| 7,689,822 B2 | 3/2010 | Maggenti et al. |
| 7,712,136 B2* | 5/2010 | Sprosts et al. .................. 726/24 |
| 7,716,367 B1 | 5/2010 | Leighton et al. |
| 7,725,602 B2 | 5/2010 | Liu et al. |
| 7,756,930 B2 | 7/2010 | Brahms et al. |
| 7,774,843 B1 | 8/2010 | Prakash |
| 7,797,443 B1 | 9/2010 | Pettigrew et al. |
| 7,849,143 B2 | 12/2010 | Vuong et al. |
| 7,873,695 B2* | 1/2011 | Clegg et al. .................. 709/206 |
| 7,882,189 B2 | 2/2011 | Wilson et al. |
| 7,891,001 B1 | 2/2011 | Greenawalt et al. |
| 7,895,651 B2 | 2/2011 | Brennan |
| 7,917,588 B2 | 3/2011 | Clegg et al. |
| 7,917,961 B2 | 3/2011 | McIsaac et al. |
| 7,926,104 B1 | 4/2011 | Sundaram et al. |
| 7,970,832 B2 | 6/2011 | Perry et al. |
| 7,984,493 B2* | 7/2011 | Jones ............................ 726/12 |
| 8,011,003 B2 | 8/2011 | Rowney et al. |
| 8,032,594 B2* | 10/2011 | Helsper et al. ............... 709/206 |
| 8,037,144 B2 | 10/2011 | Lund et al. |
| 8,037,527 B2* | 10/2011 | Milener et al. ................. 726/22 |
| 8,095,537 B2* | 1/2012 | Wolff et al. ................... 707/728 |
| 8,185,741 B1* | 5/2012 | Agrawal et al. .............. 713/176 |
| 8,219,620 B2 | 7/2012 | Hart |
| 8,219,630 B2* | 7/2012 | Cunningham ................ 709/206 |
| 8,380,791 B1 | 2/2013 | Gordon et al. |
| 8,601,160 B1 | 12/2013 | Sargent et al. |
| 8,838,714 B2 | 9/2014 | Hart |
| 8,880,611 B1* | 11/2014 | Lim et al. ...................... 709/206 |
| 2002/0001307 A1 | 1/2002 | Nguyen et al. |
| 2002/0016824 A1 | 2/2002 | Leeds |
| 2002/0035566 A1 | 3/2002 | Rugg et al. |
| 2002/0073337 A1 | 6/2002 | Ioele et al. |
| 2002/0091772 A1 | 7/2002 | Yong |
| 2002/0112227 A1 | 8/2002 | Kramskoy et al. |
| 2002/0116463 A1 | 8/2002 | Hart |
| 2002/0120705 A1 | 8/2002 | Schiavone et al. |
| 2003/0087646 A1 | 5/2003 | Funato et al. |
| 2003/0088627 A1 | 5/2003 | Rothwell et al. |
| 2003/0158905 A1 | 8/2003 | Petry et al. |
| 2003/0177188 A1 | 9/2003 | Brubacher et al. |
| 2004/0117450 A1 | 6/2004 | Campbell et al. |
| 2004/0177120 A1* | 9/2004 | Kirsch ......................... 709/206 |
| 2005/0015626 A1 | 1/2005 | Chasin |
| 2005/0060535 A1* | 3/2005 | Bartas .......................... 713/154 |
| 2005/0078088 A1 | 4/2005 | Davis et al. |
| 2005/0097177 A1 | 5/2005 | McUmber et al. |
| 2005/0177752 A1 | 8/2005 | Hollander et al. |
| 2005/0198511 A1* | 9/2005 | Tomkow ...................... 713/176 |
| 2006/0085543 A1 | 4/2006 | Hrastar et al. |
| 2006/0101273 A1 | 5/2006 | Tan et al. |
| 2006/0149823 A1 | 7/2006 | Owen et al. |
| 2006/0168006 A1* | 7/2006 | Shannon et al. .............. 709/206 |
| 2007/0005782 A1* | 1/2007 | Zheng .......................... 709/230 |
| 2007/0028110 A1* | 2/2007 | Brennan ....................... 713/176 |
| 2007/0067682 A1 | 3/2007 | Fang |
| 2007/0079379 A1 | 4/2007 | Sprosts et al. |
| 2007/0083929 A1 | 4/2007 | Sprosts et al. |
| 2007/0220607 A1 | 9/2007 | Sprosts et al. |
| 2008/0140847 A1 | 6/2008 | Almog |
| 2009/0262741 A1 | 10/2009 | Jungck et al. |
| 2012/0185549 A1 | 7/2012 | Hart |

(56) References Cited

U.S. PATENT DOCUMENTS

| | | | |
|---|---|---|---|
| 2012/0185550 | A1 | 7/2012 | Hart |
| 2012/0185551 | A1 | 7/2012 | Hart |
| 2014/0040403 | A1 | 2/2014 | Sargent |

FOREIGN PATENT DOCUMENTS

| | | |
|---|---|---|
| WO | WO 98/37680 | 8/1998 |
| WO | WO 99/33188 | 7/1999 |
| WO | WO 99/67731 | 12/1999 |
| WO | WO 03/010680 | 2/2003 |

OTHER PUBLICATIONS

Klensin, J. "Application Techniques for Checking and Transformation of Names," RFC 3696, Feb. 2004.*
Gustafsson, A. "Handling of Unknown DNS Resource Record (RR) Types," RFC 3597, Sep. 2003.*
Non-Final Office Action in U.S. Appl. No. 13/429,338 mailed on Mar. 13, 2014.
Final Office Action in U.S. Appl. No. 13/429,345 mailed on Jan. 17, 2014.
Final Office Action in U.S. Appl. No. 13/429,354 mailed on Jan. 3, 2014.
Notice of Allowance in U.S. Appl. No. 13/429,345 mailed on May 27, 2014.
Tim Bass, Lt. Col. Glenn Watt, "A Simple Framework for Filtering Queued SMTP Mail", 1997, IEEE, pp. 1140-1144.
Keith C. Ivey, "Spam: The Plague of Junk E-Mail", Apr. 1998, EEI Communications, pp. 15-16 (Cited in U.S. Appl. No. 09/916,599).
Harris Ducker, "Support Vector Machines for Spam Categorization", Sep. 1999, IEEE Transactions on Neural Networks, vol. 10, No. 5, pp. 1048-1054, Cited in U.S. Appl. No. 09/916,599).
DNSBL, http://en.wikipedia.org/wiki/DNSBL.
Rekhter, Y. et al., "Address Allocation for Private Internets," RFC 1918, Feb. 1996.
Ferguson, P. et al., "Network Ingress Filtering: Defeating Denial of Service Attacks Which Employ IP Source Address Spoofing," RFC 2827, May 2000.
Callon, R. et al., "Guidelines for the Use of Internet IP-Addresses in the ISO Connectionless-Mode Network Protocol," RFC 1069, Feb. 1989.
Warnicke, E, "Suggested Scheme for DNS Resolution of Networks and Gateways," RFC 4183, Sep. 2005.
Gansterer, W. et al., "Anti-Spam Methods," State-of-the-Art, Mar. 2005, University of Vienna, Austria, pp. 1, 4-7, 19-21, 29-32.
Lynn, C. et al. "X.509 Extensions for IP Addresses and AS Identifiers," RFC 3779, Jun. 2004.
John Viega et al., "Mailman: The GNU Mailing List Manager," 1998 LISA XII—Dec. 6-11, 1998 (pp. 309-316).
PCT Written Opinion in International Application Serial No. PCT/US02/23811 mailed on May 1, 2003.
International Search Report in PCT International Application No. PCT/US02/023811 mailed on Oct. 29, 2002.
International Preliminary Examination Report in PCT International Application No. PCT/US02/23811 completed on Jul. 9, 2003.
U.S. Appl. No. 09/916,599, filed Jul. 26, 2001.
Non-Final Office Action in U.S. Appl. No. 09/916,599 mailed on Oct. 7, 2004.
Response to Non-Final Office Action dated Oct. 7, 2001 in U.S. Appl. No. 09/916,599, filed Oct. 21, 2004.
Non-Final Office Action in U.S. Appl. No. 09/916,599 mailed on Feb. 23, 2005.
Response to Non-Final Office Action dated Feb. 23, 2005 in U.S. Appl. No. 09/916,599, filed Mar. 30, 2005.
Notice of Allowance in U.S. Appl. No. 09/916,599 mailed on Jun. 10, 2005.
Notice of Allowance in U.S. Appl. No. 09/916,599 mailed on Sep. 23, 2005.
Non-Final Office Action in U.S. Appl. No. 11/095,146 mailed on Jul. 18, 2006.
Response to Non-Final Office Action dated Jul. 18, 2006 in U.S. Appl. No. 11/095,146, filed Nov. 20, 2006.
Notice of Allowance in U.S. Appl. No. 11/095,146 mailed on Dec. 15, 2006.
USPTO File History for U.S. Appl. No. 09/916,930, filed Jul. 26, 2001.
U.S. Appl. No. 10/072,708, filed Feb. 5, 2002.
Non-Final Office Action in U.S. Appl. No. 10/072,708 mailed on Apr. 6, 2005.
Response to Non-Final Office Action dated Apr. 6, 2005 in U.S. Appl. No. 10/072,708, filed May 4, 2005.
Non-Final Office Action in U.S. Appl. No. 10/072,708 mailed on Jul. 25, 2008.
Response to Non-Final Office Action dated Jul. 25, 2008 in U.S. Appl. No. 10/072,708, filed Aug. 30, 2005.
Non-Final Office Action in U.S. Appl. No. 10/072,708 mailed on Nov. 18, 2005.
Response to Non-Final Office Action dated Nov. 18, 2005 in U.S. Appl. No. 10/072,708, filed Feb. 13, 2006.
Final Office Action in U.S. Appl. No. 10/072,708 mailed on May 3, 2006.
Pre-Brief Conference Request and Notice of Appeal in U.S. Appl. No. 10/072,708, filed Aug. 3, 2006.
Supplemental Appeal Brief in U.S. Appl. No. 10/072,708, filed Mar. 8, 2007.
Examiner's Answer to Appeal Brief in U.S. Appl. No. 10/072,708 mailed on Jul. 2, 2007.
Reply Brief in U.S. Appl. No. 10/072,708, filed Sep. 4, 2007.
BAPI Decision in U.S. Appl. No. 10/072,708 mailed on Feb. 26, 2009.
Request for Continued Examination and Amendment in U.S. Appl. No. 10/072,708 mailed on Apr. 27, 2009.
Non-Final Office Action in U.S. Appl. No. 10/072,708 mailed on May 28, 2009.
Response to Non-Final Office Action dated May 28, 2009 in U.S. Appl. No. 10/072,708, filed Aug. 28, 2009.
Notice of Allowance, Examiner Interview Summary, Notice of Allowability in U.S. Appl. No. 10/072,708 mailed on Nov. 2, 2009.
U.S. Appl. No. 09/785,240, filed Feb. 20, 2001.
Non-Final Office Action in U.S. Appl. No. 09/785,240 mailed on Jun. 14, 2004.
Response to Non-Final Office Action dated Jun. 14, 2004 in U.S. Appl. No. 09/785,240, filed Sep. 3, 2004.
Non-Final Office Action in U.S. Appl. No. 09/785,240 mailed on Jan. 18, 2005.
Response to Non-Final Office Action dated Jan. 18, 2005 in U.S. Appl. No. 09/785,240, filed Apr. 18, 2005.
Non-Final Office Action in U.S. Appl. No. 09/785,240 mailed on Jun. 30, 2005.
Response to Non-Final Office Action dated Jun. 30, 2005 in U.S. Appl. No. 09/785,240, filed Oct. 12, 2005.
Final Office Action in U.S. Appl. No. 09/785,240 mailed on Jan. 3, 2006.
Response to Final Office Action dated Jan. 3, 2006 in U.S. Appl. No. 09/785,240, filed Feb. 21, 2006.
Advisory Action in U.S. Appl. No. 09/785,240 mailed on Mar. 23, 2006.
Pre-Brief Conference Request and Notice of Appeal in U.S. Appl. No. 09/785,240, filed May 5, 2006.
Pre-Brief Conference Decision in U.S. Appl. No. 09/785,240 mailed on Jul. 5, 2006.
Appeal Brief in U.S. Appl. No. 09/785,240, filed Feb. 26, 2007.
Examiner's Answer to Appeal Brief in U.S. Appl. No. 09/785,240 mailed on Nov. 16, 2007.
Reply Brief in U.S. Appl. No. 09/785,240, filed Jan. 16, 2008.
BPAI Decision on Appeal in U.S. Appl. No. 09/785,240 mailed on Oct. 6, 2011.
Request for Continued Examination and Amendment in U.S. Appl. No. 09/785,240, filed Nov. 30, 2011.
Notice of Allowance and Examiner Interview Summary in U.S. Appl. No. 09/785,240 mailed on Jan. 6, 2012.

(56) References Cited

OTHER PUBLICATIONS

Request for Continued Examination and Amendment in U.S. Appl. No. 09/785,240, filed Mar. 7, 2012.
Notice of Allowance in U.S. Appl. No. 09/785,240 mailed on Jun. 7, 2012.
U.S. Appl. No. 13/429,338 entitled "Unwanted E-Mail Filtering System Including Voting Feedback", filed on Mar. 24, 2012.
Non-Final Office Action in U.S. Appl. No. 13/429,338 mailed on Jun. 28, 2012.
Response to Non-Final Office Action dated Jun. 28, 2012 in U.S. Appl. No. 13/429,338, filed Sep. 28, 2012.
Final Office Action in U.S. Appl. No. 13/429,338 mailed on Jan. 18, 2013.
Request for Continued Examination and Amendment in U.S. Appl. No. 13/429,338, filed Mar. 18, 2013.
Non-Final Office Action in U.S. Appl. No. 13/429,338 mailed on Aug. 22, 2013.
U.S. Appl. No. 13/429,345 entitled "Unwanted E-Mail Filtering System Including Voting Feedback", filed on Mar. 24, 2012.
Non-Final Office Action in U.S. Appl. No. 13/429,345 mailed on Jun. 28, 2012.
Response to Non-Final Office Action dated Jun. 28, 2012 in U.S. Appl. No. 13/429,345, filed Sep. 28, 2012.
Final Office Action in U.S. Appl. No. 13/429,345 mailed on Jan. 29, 2013.
Response to Final Office Action in U.S. Appl. No. 13/429,345, filed Apr. 29, 2013.
Non-Final Office Action in U.S. Appl. No. 13/429,345 mailed on Jun. 20, 2013.
Response to Non-Final Office Action in U.S. Appl. No. 13/429,345, filed Sep. 18, 2013.
U.S. Appl. No. 13/429,354 entitled "Unwanted E-Mail Filtering System Including Voting Feedback", filed on Mar. 24, 2012.
Non-Final Office Action in U.S. Appl. No. 13/429,354 mailed on Jun. 21, 2012.
Response to Non-Final Office Action dated Jun. 21, 2012 in U.S. Appl. No. 13/429,354, filed Sep. 21, 2012.
Final Office Action in U.S. Appl. No. 13/429,354 mailed on Jan. 29, 2013.
Response to Final Office Action in U.S. Appl. No. 13/429,354, filed Apr. 29, 2013.
Non-Final Office Action in U.S. Appl. No. 13/429,354 mailed on Jun. 21, 2013.
Response to Non-Final Office Action in U.S. Appl. No. 13/429,354, filed Sep. 13, 2013.
U.S. Appl. No. 11/281,966, filed Nov. 16, 2005.
Non-Final Office Action in U.S. Appl. No. 11/281,966 mailed on Sep. 18, 2009.
Response to Non-Final Office Action dated Sep. 18, 2009 in U.S. Appl. No. 11/281,966, filed Dec. 18, 2009.
Notice of Allowance in U.S. Appl. No. 11/281,966 mailed on Apr. 1, 2010.
Non-Final Office Action in U.S. Appl. No. 11/351,840 mailed on Jun. 11, 2009.
Response Non-Final Office Action dated Sep. 11, 2009 in U.S. Appl. No. 11/351,840, filed Sep. 11, 2009.
Final Office Action in U.S. Appl. No. 11/351,840 mailed on Jan. 6, 2010.
Response Final Office Action dated Jan. 6, 2010 in U.S. Appl. No. 11/351,840, filed Mar. 8, 2010.
Advisory Action in in U.S. Appl. No. 11/351,840 mailed on Mar. 25, 2010.
Request for Continued Examination and Amendment in U.S. Appl. No. 11/351,840, filed Apr. 6, 2010.
Non-Final Office Action in U.S. Appl. No. 11/351,840 mailed on Jun. 23, 2010.
Response Non-Final Office Action dated Jun. 23, 2010 in U.S. Appl. No. 11/351,840, filed Nov. 23, 2010.
Final Office Action in U.S. Appl. No. 11/351,840 mailed on Feb. 16, 2011.
Response Final Office Action dated Feb. 16, 2011 in U.S. Appl. No. 11/351,840, filed Apr. 18, 2011.
Examiner Interview Summary in U.S. Appl. No. 11/351,840 mailed on Apr. 28, 2011.
Advisory Action in in U.S. Appl. No. 11/351,840 mailed on May 5, 2011.
Request for Continued Examination and Amendment in U.S. Appl. No. 11/351,840, filed May 16, 2011.
Non-Final Office Action in U.S. Appl. No. 11/351,840 mailed on Jul. 22, 2011.
Response to Non-Final Office Action dated Jul. 22, 2011 in U.S. Appl. No. 11/351,840, filed Oct. 24, 2011.
Final Office Action in U.S. Appl. No. 11/351,840 mailed on Feb. 3, 2012.
Request for Continued Examination and Amendment in U.S. Appl. No. 11/351,840, filed May 2, 2012.
Notice of Allowance in U.S. Appl. No. 11/351,840 mailed on Aug. 9, 2013.
U.S. Appl. No. 10/318,620, filed Dec. 13, 2002.
Office Actions and Responses in U.S. Appl. No. 10/318,620, filed Dec. 13, 2002.

* cited by examiner

SYSTEM, METHOD AND COMPUTER PROGRAM PRODUCT FOR GATHERING INFORMATION RELATING TO ELECTRONIC CONTENT UTILIZING A DNS SERVER

CROSS-REFERENCE TO RELATED APPLICATION

This application is a continuation (and claims the benefit of priority under 35 U.S.C. §120) of U.S. patent application Ser. No. 11/351,840 filed on Feb. 9, 2006 entitled "SYSTEM, METHOD AND COMPUTER PROGRAM PRODUCT FOR GATHERING INFORMATION RELATING TO ELECTRONIC CONTENT UTILIZING A DNS SERVER." The disclosure of the prior application is considered part of (and are incorporated herein by reference) the disclosure of this application.

FIELD OF THE INVENTION

The present invention relates to electronic content, and more particularly to gathering information relating to electronic content.

BACKGROUND

The Internet is constantly growing in popularity, and more and more people are conducting business over the Internet, advertising their products and services by generating and sending electronic mass mailings. This electronic mail (e-mail) is usually unsolicited and regarded as nuisances by the recipients because they occupy much of the storage space needed for necessary and important data processing.

Therefore, it is highly desirable to have a filter system for screening and managing unwanted e-mails (and other electronic content, for that matter), while desired e-mails pass through the system to reach the recipients. Presently, there are products that are capable of filtering out unwanted e-mails, etc.

For example, one method exists which keeps an index list of all agents (e.g. companies, origination addresses, etc.) that generate mass unsolicited e-mails, and provides a mechanism to block any e-mail sent from each agent on the list. Another filter currently available employs filters which are based on predefined characteristics [e.g. words, uniform resource locators (URLs), patterns, etc.]. An incoming e-mail may thus be designated as an unwanted e-mail if, for example, it contains one or more of such characteristics.

In order to be effective, the aforementioned lists and/or characteristics must be constantly updated in order for the foregoing systems to be effective. Currently, these updates are streamed out to filtering systems at regular, predetermined intervals, and are streamed in their entirety. Unfortunately, this can result in considerable use of network bandwidth and/or other resources.

There is thus a need for overcoming these and/or other problems associated with the prior art.

SUMMARY

A system, method and computer program product are provided. In use, a checksum associated with electronic content is calculated. Further, a domain name service (DNS) server is queried utilizing the checksum. In response to the query, information is received from the DNS server which relates to the electronic content.

DETAILED DESCRIPTION

Figure 1:
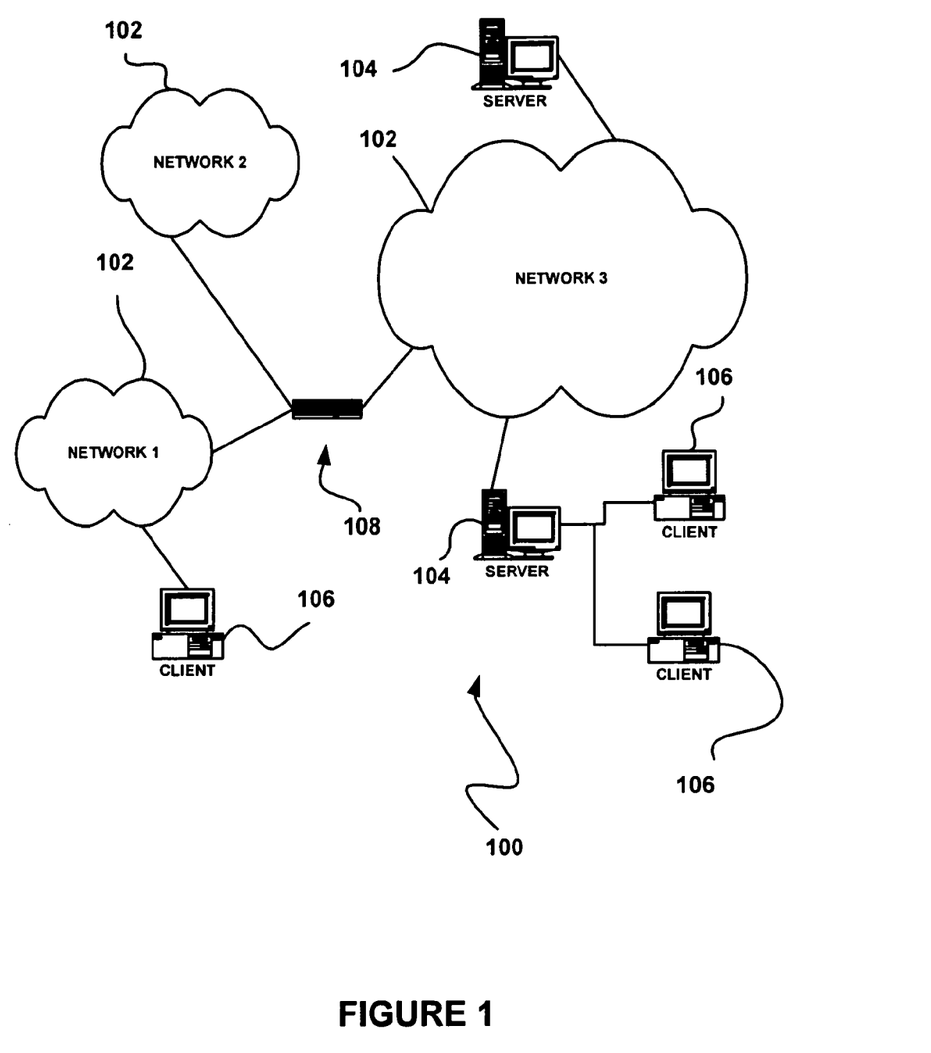
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are server computers 104 which are capable of communicating over the networks 102. Also coupled to the networks 102 and the server computers 104 is a plurality of client computers 106. Such server computers 104 and/or client computers 106 may each include a domain name service (DNS) server, desktop computer, laptop computer, hand-held computer, mobile phone, hand-held computer, peripheral (e.g. printer, etc.), any component of a computer, and/or any other type of logic. In order to facilitate communication among the networks 102, at least one gateway or router 108 is optionally coupled therebetween.

Figure 2:
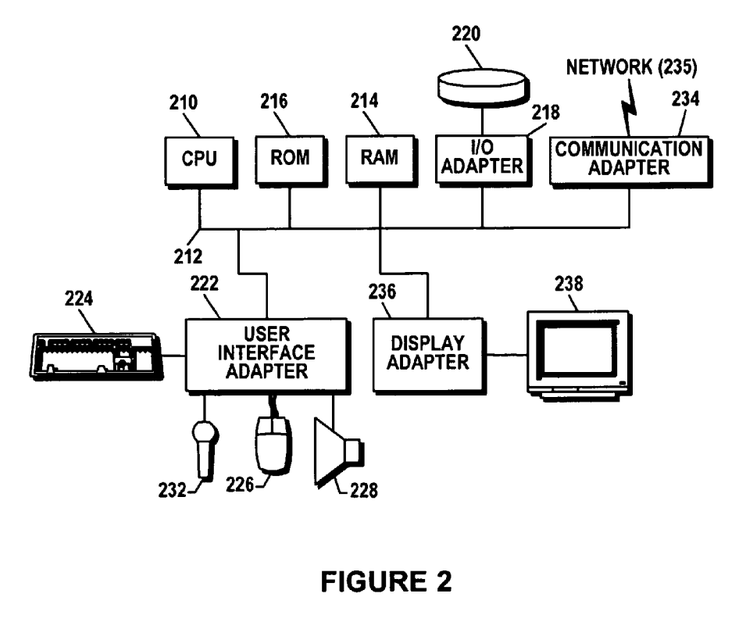
FIG. 2 shows a representative hardware environment that may be associated with the server computers and/or client computers of FIG. 1, in accordance with one embodiment.

FIG. 2 shows a representative hardware environment that may be associated with the server computers 104 and/or client computers 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
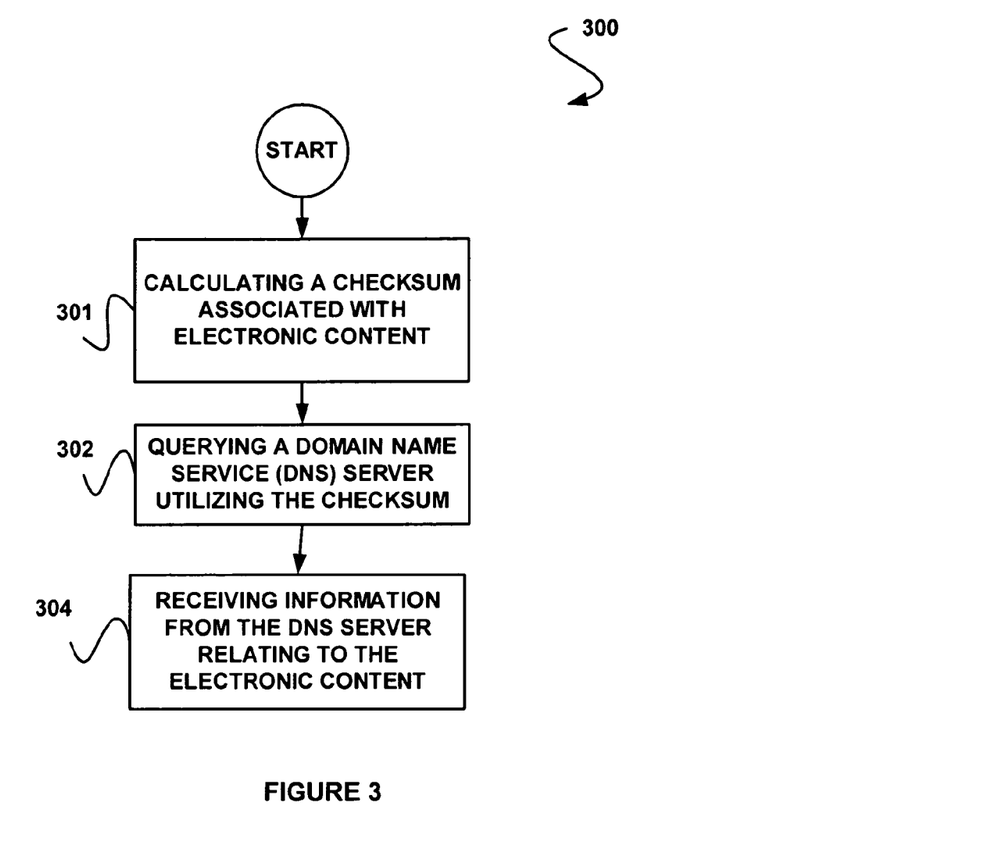
FIG. 3 shows a method for gathering information relating to electronic content, in accordance with one embodiment.

FIG. 3 shows a method 300 for gathering information relating to electronic content, in accordance with one embodiment. As an option, the method 300 may be implemented in the context of the architecture and environment of FIGS. 1 and/or 2. Of course, however, the method 300 may be carried out in any desired environment.

As shown, a checksum associated with electronic content is calculated. See operation 301. In the context of the present embodiment, such electronic content may refer to an electronic mail message, a web page, a file, and/or any other content (and/or component, artifact, etc. thereof) that may be distributed over a network (e.g. see, for example, the networks 102 of FIG. 1, etc.).

In an optional embodiment where the electronic content refers to an electronic mail message, such a message may be sent utilizing the simple mail transfer protocol (SMTP), and may be received utilizing the POP3 protocol. Still yet, in other embodiments, the electronic mail message may be generated and received utilizing an electronic mail message manager (e.g. MICROSOFT OUTLOOK, etc.) including composing, reading, and sending capabilities. Of course, other protocols are contemplated including, but not limited to ESMTP, X.400, instant messaging protocols, etc.

Further in the context of the present description, the checksum may refer to any string capable of being received and utilized by a DNS server (as defined below). For example, in one optional embodiment, the checksum may include a value or signature derived from a calculation performed upon one or more components [e.g. image, binary string, uniform resource locator (URL), text string, characters, bits, etc.] of the electronic content such that, when re-calculated, the same value is provided for the one or more components. Further, such value is unique to such set of components.

Next, in operation 302, a domain name service (DNS) server is queried utilizing the checksum. In the context of the present description, the DNS server may refer to any computer that is capable of making information available, in response to a query including the aforementioned checksum. To this end, in response to the query, information is received from the DNS server which relates to the electronic content. Note operation 304. It should be noted that the aforementioned information may include any information relating to the electronic content that may be used for absolutely any purpose desired.

For example, in one optional embodiment, the DNS server may resolve a string concocted utilizing the checksum and formatted as (or similar to) a host name, with an Internet Protocol (IP) address that may itself include and/or be used to gain access to information relating to the electronic content. Further, in the context of one embodiment for identifying unwanted electronic mail messages, the IP address may be utilized to determine whether the electronic mail message is unwanted, and/or determine an action to be taken on the electronic mail message.

More illustrative information will now be set forth regarding various optional architectures and features with which the foregoing technique may or may not be implemented, per the desires of the user. Specifically, more information will be set forth regarding an optional embodiment whereby the various techniques associated with the method 300 of FIG. 3 are used to identify unwanted electronic mail messages.

It should be strongly noted, however, that the following information is set forth for illustrative purposes and should not be construed as limiting in any manner. Any of the following features may be optionally incorporated with or without the exclusion of other features described in and out of a security-related context.

Figure 4:
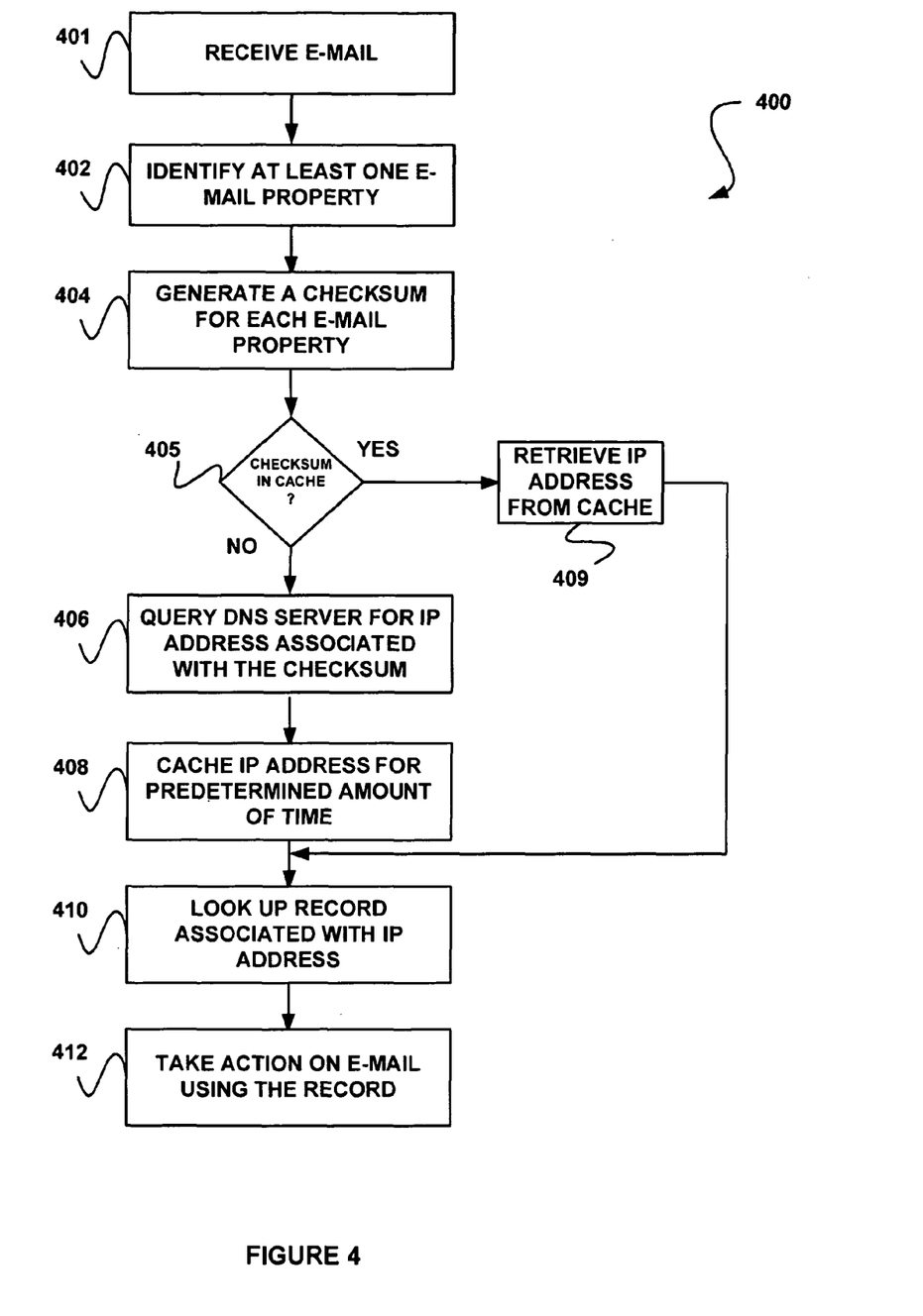
FIG. 4 illustrates a method for gathering information relating to electronic content, in accordance with another embodiment.

FIG. 4 illustrates a method 400 for gathering information relating to electronic content, in accordance with another embodiment. As an option, the method 400 may be implemented in the context of the architecture and environment of FIGS. 1-3. Of course, however, the method 400 may be used in any desired environment. Further, the aforementioned definitions may equally apply to the description below.

As shown, in operation 401, an electronic message is initially received. Such electronic message may be received at a client computer (e.g. see, for example, the client computers 106 of FIG. 1, etc.) and/or at a server computer (e.g. see, for example, the server computers 104 of FIG. 1, etc.) via one or more networks (e.g. see, for example, the networks 102 of FIG. 1, etc.). Optionally, such receipt may be carried out utilizing a server or client-based electronic mail manager.

After receiving the electronic mail message, at least one property associated with such electronic mail message may be identified. Note operation 402. As mentioned previously, such one or more properties may include any component [e.g. image, binary string, uniform resource locator (URL), text string, characters, bits, etc.] of the electronic mail message. Further, such properties may be parsed in any desired manner. Just by way of example, a list of desired components may be provided, whereby each of such components may be identified by parsing the electronic mail message.

Thereafter, in operation 404, a checksum is generated for each property of the electronic mail message. To this one, a plurality of checksums is provided as a result of the present operation. Table 1 illustrates one example of a checksum that relates to an image associated with an electronic mail message. Of course, the 40 character string checksum is set forth for illustrative purposes only and should not be construed as limiting in any manner whatsoever.

TABLE 1

| 434683b65810caff6e9e5cb8fc52def422ad5f30 |
|---|

Next, it is determined whether the checksum(s) is present in a cache. See decision 405. It should be noted that such cache may include cache memory on a computer at which the electronic mail message was received, a local DNS server, and/or any other cache, for that matter. More information regarding such cache will be set forth hereinafter in greater detail.

If it is determined that the checksum is not already stored in the cache per decision 405, a DNS server is queried for an IP address associated with the checksum. Note operation 406. Such DNS server may include a local DNS server, remote DNS server, and/or any other DNS server that requires more time and/or resources (e.g. bandwidth, processing, etc.) for producing the IP address, with respect to the aforementioned cache. For reasons that will soon become apparent, each of the IP addresses delivered by the DNS server includes and/or provides access to information associated with the electronic mail message property represented by the checksum.

In the context of the example where the checksum takes the form shown in Table 1, the query made to the DNS server may take the form of a pseudo-host in an "antispam" domain (e.g. image-rbl.mcafee.com, etc.) in order to obtain the information regarding the checksum (and associated electronic message property, etc.).

Strictly as an option, a plurality of domains may be provided for servicing different checksums. For example, a first domain may be used to service checksums associated with images in electronic mail messages, a second domain may be used to service checksums associated with text strings in electronic mail messages, and so forth.

Table 2 illustrates one example of a DNS server query. Of course, such query is set forth for illustrative purposes only and should not be construed as limiting in any manner whatsoever.

TABLE 2

434683b65810caff6e9e5cb8fc52def422ad5f30.image-rbl.mcafee.com

Next, in operation 408, the IP address received via the DNS server in operation 406 is stored in the cache. Such IP address is cached in association with the corresponding checksum. Further, as an option, the checksum and the associated IP address may be cached a predetermined amount of time. Still yet, the predetermined amount of time may be determined utilizing the IP address, in a manner that will soon become apparent.

Reference will now be made back to decision 405. If, on the other hand, it is determined that the checksum is indeed already stored in the cache per decision 405, the associated IP address may simply be retrieved from cache. To this end, the querying of the DNS server in operation 406 is conditionally performed based on whether the IP address is cached, thereby saving time and/or resources by skipping operations 406-408, if possible.

In any case, armed with the appropriate IP address (if one is received at all), information in the form of a record may be looked up using the same. Note operation 410. If, for some reason, no IP address is available, a default action may be taken. For example, it may be assumed that the electronic mail message that has the property that gave rise to the checksum is wanted, or at least not unwanted. On the other hand, if such IP address is found, it may be used to retrieve additional information describing the property, and by inference, the electronic mail message.

In one embodiment, the additional information may be stored on (and/or near) a computer that carried out any one or more of the operations 401-409. Further, such information may be used to determine whether the electronic mail message associated with the property is unwanted, and determine an action to be taken on the electronic mail message. See operation 412. More information regarding such information will be set forth in greater detail during reference to FIG. 5.

By these features, a computer may optionally forego downloading unwanted electronic mail message database updates periodically, and may further build a local list containing only information relevant to the computer at issue, using a DNS system.

Figure 5:
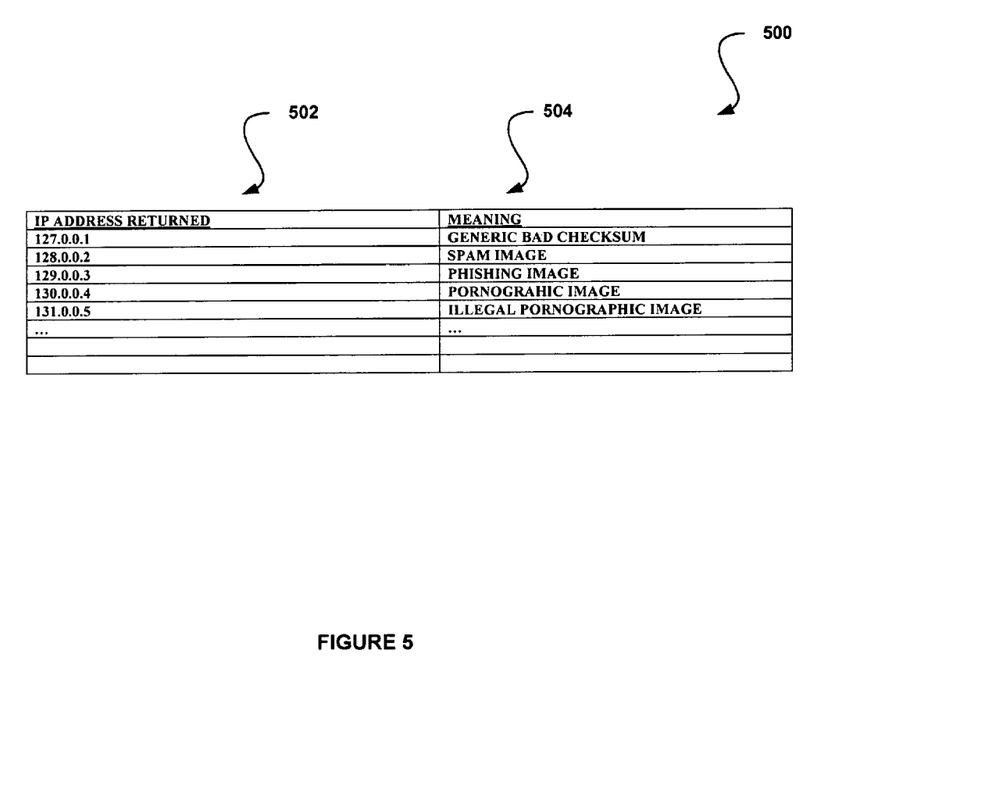
FIG. 5 illustrates a data structure for gathering information relating to electronic content, in accordance with another embodiment.

FIG. 5 illustrates a data structure 500 for gathering information relating to electronic content, in accordance with another embodiment. As an option, the data structure 500 may be implemented in the context of operation 410 of FIG. 4. Of course, however, the data structure 500 may be used in any desired environment. Further, the aforementioned definitions may equally apply to the description below.

As shown, a plurality of IP addresses 502 is provided each with associated information 504. As shown, such information 504 may identify whether the electronic content is unwanted and, if so, a type, description, identification, etc. thereof.

While not shown, the information 504 may further identify an action to be taken on the electronic content. Such action may include, but is not limited to quarantining the content, deleting the content, cleaning the content, generating an alert, notifying an administrator regarding the content, etc.

Even still, the information 504 may further identify an amount of time that the checksum/IP address is to be cached. See operation 408 of FIG. 4, for example. This length of time may be user-configured based on any desired criteria. Just by way of example, checksums associated with mail properties that are serious and/or occur often may be cached longer, and visa-versa.

As yet another option, each portion of the dotted-quad IP address may provide specific information about the electronic mail property queried. See Table 3, for example.

TABLE 3

IP Address: aaa.b.c.d
where:
aaa uniquely identifies the property;
b identifies a type of the property;
c identifies an action to be taken on the e-mail; and
d identifies a duration in which the checksum/address is to be cached.

Thus, each of the portions may be altered to manage a particular aspect of e-mail content. Table 4 illustrates one exemplary specific IP address that indicates that a checksum matches a pornographic image, to be deleted, where the checksum should not be cached longer than 15 days.

TABLE 4

129.0.15.4
129 = unique identifier;
0 = the content is a pornographic image;
15 = the action to take is a delete action; and
4 = indicates the 15 day cache duration.

To this end, the correlation of various IP addresses/information and associated checksums/electronic content may be carried out by one or more administrators, or in any other desired manner, at a central (or distributed) location. Further, such correlation may be updated and/or changed at any time. For example, an action and/or cache period may be altered with respect to a uniquely identified item of unwanted content, based on various factors, etc.

Further, a particular computer may efficiently build up a cache of checksums that are relevant to types of electronic mail messages (or other content) that are received, without necessarily downloading large volumes of checksums and/or other updates, many or most of which may never be used. This may be particularly valuable for applications running on computers that have restricted bandwidth and/or only process a few electronic mail messages each day.

In one embodiment, terrorism may be countered utilizing the aforementioned technology. According to the U.S. Federal Bureau of Investigation, cyber-terrorism is any "premeditated, politically motivated attack against information, computer systems, computer programs, and data which results in violence against non-combatant targets by subnational groups or clandestine agents." A cyber-terrorist attack is designed to cause physical violence or extreme financial harm. According to the U.S. Commission of Critical Infrastructure Protection, possible cyber-terrorist targets include the banking industry, military installations, power plants, air traffic control centers, and water systems.

Thus, by optionally incorporating the present technology into the cyber-frameworks of the foregoing potential targets, terrorism may be countered by preventing inundation with unwanted electronic content, which may potentially cause extreme financial harm.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method, comprising:
    calculating a checksum associated with electronic content that refers to an electronic e-mail message;
    sending the checksum to a domain name service (DNS) server;
    receiving information from the DNS server, the information comprising an Internet Protocol (IP) address associated with the checksum; and
    taking an action on the e-mail message based on the IP address.

2. The method of claim 1, further comprising:
    caching the checksum and the IP address for a predetermined amount of time.

3. The method of claim 1, wherein a plurality of domains is provided for servicing different types of checksums such that a particular DNS server that receives a particular checksum is selected based on the particular checksum.

4. The method of claim 1, further comprising:
    determining whether a particular checksum is present in a cache; and
    querying the DNS server for a particular IP address associated with the particular checksum if the particular checksum is not in the cache.

5. The method of claim 1, wherein if a particular IP address is not identified by the DNS server for a particular electronic e-mail message, a default action is taken and the particular electronic e-mail message is presumed to be wanted.

6. The method of claim 1, wherein the checksum includes a value or a signature derived from a calculation performed on one or more components of the electronic content in the electronic e-mail message.

7. The method of claim 6, wherein the one or more components are selected from a group of components, the group consisting of:
    a) an image;
    b) a binary string;
    c) a uniform resource locator (URL);
    d) a text string;
    e) a plurality of characters; and
    f) a plurality of bits.

8. The method of claim 1, wherein each IP address delivered by the DNS server provides access to particular information associated with a particular electronic mail message property represented by a particular checksum.

9. The method of claim 1, wherein the action is selected from a group of actions, the group consisting of:
    a) quarantining the electronic content;
    b) deleting the electronic content;
    c) cleaning the electronic content;
    d) generating an alert; and
    e) notifying an administrator regarding the electronic content.

10. The method of claim 1, wherein querying the DNS server is conditionally performed based on whether the IP address associated with the electronic e-mail message is cached.

11. One or more computer-readable storage media storing instructions that, when executed, cause a computing device to perform a method, the method comprising:
    calculating a checksum associated with electronic content that refers to an electronic e-mail message;
    sending the checksum to a domain name service (DNS) server;
    receiving information from the DNS server, the information comprising an Internet Protocol (IP) address associated with the checksum; and
    taking an action on the e-mail message based on the IP address.

12. The media method of claim 11, the method further comprising:
    caching the checksum and the IP address for a predetermined amount of time.

13. The media of claim 11, wherein a plurality of domains is provided for servicing different types of checksums such that a particular DNS server that receives a particular checksum is selected based on the particular checksum.

14. The media of claim 11, the method further comprising:
    determining whether a particular checksum is present in a cache; and
    querying the DNS server for a particular IP address associated with the particular checksum if the particular checksum is not in the cache.

15. The media of claim 11, wherein if a particular IP address is not identified by the DNS server for a particular electronic e-mail message, a default action is taken and the particular electronic e-mail message is presumed to be wanted.

16. The media of claim 11, wherein the checksum includes a value or a signature derived from a calculation performed on one or more components of the electronic content in the electronic e-mail message.

17. The media of claim 16, wherein the one or more components are selected from a group of components, the group consisting of:
    a) an image;
    b) a binary string;
    c) a uniform resource locator (URL);
    d) a text string;
    e) a plurality of characters; and
    f) a plurality of bits.

18. The media of claim 11, wherein each IP address delivered by the DNS server provides access to particular information associated with a particular electronic mail message property represented by a particular checksum.

19. The media of claim 11, wherein the action is selected from a group of actions, the group consisting of:
    f) quarantining the electronic content;
    g) deleting the electronic content;
    h) cleaning the electronic content;
    i) generating an alert; and
    j) notifying an administrator regarding the electronic content.

20. The media of claim 11, wherein querying the DNS server is conditionally performed based on whether the IP address associated with the electronic e-mail message is cached.

21. A computer, comprising:
    a processor; and
    a memory coupled to the processor, wherein the computer is configured to:
        calculate a checksum associated with electronic content that refers to an electronic e-mail message;

send the checksum to a domain name service (DNS) server;

receive information from the DNS server, the information comprising an Internet Protocol (IP) address associated with the checksum; and take an action on the e-mail message based on the IP address.

22. The computer of claim 21, wherein the computer is further configured to:

cache the checksum and the IP address for a predetermined amount of time.

23. The computer of claim 21, wherein a plurality of domains is provided for servicing different types of checksums such that a particular DNS server that receives a particular checksum is selected based on the particular checksum.

24. The computer of claim 21, wherein the computer is further configured to:

determine whether a particular checksum is present in a cache; and query the DNS server for a particular IP address associated with the particular checksum if the particular checksum is not in the cache.

25. The computer of claim 21, wherein if a particular IP address is not identified by the DNS server for a particular electronic e-mail message, a default action is taken and the particular electronic e-mail message is presumed to be wanted.

26. The computer of claim 21, wherein the checksum includes a value or a signature derived from a calculation performed on one or more components of the electronic content in the electronic e-mail message.

27. The computer of claim 21, wherein each IP address delivered by the DNS server provides access to particular information associated with a particular electronic mail message property represented by a particular checksum.

28. The computer of claim 21, wherein the action is selected from a group of actions, the group consisting of:

a) quarantining the electronic content;
b) deleting the electronic content;
c) cleaning the electronic content;
d) generating an alert; and
e) notifying an administrator regarding the electronic content.

29. The computer of claim 21, wherein querying the DNS server is conditionally performed based on whether the IP address associated with the electronic e-mail message is cached.

* * * * *